United States Patent [19]

Panaroni et al.

[11] Patent Number: 5,254,405
[45] Date of Patent: Oct. 19, 1993

[54] NON-CELLULAR POLYURETHANE COMPOSITE

[75] Inventors: Vincent F. Panaroni, El Toro; Thomas R. McClellan, Mission Viejo, both of Calif.

[73] Assignee: Urethane Technologies, Incorporated, Irvine, Calif.

[21] Appl. No.: 771,308

[22] Filed: Oct. 2, 1991

[51] Int. Cl.$^5$ .................. B32B 5/16; B32B 27/40
[52] U.S. Cl. .................. 428/327; 36/25 R; 428/328; 428/330; 428/331; 428/423.9; 524/507; 525/130
[58] Field of Search .......... 428/327, 423.9, 330, 428/331, 328; 524/507; 525/130; 36/25 R

[56] References Cited

U.S. PATENT DOCUMENTS

| | | | |
|---|---|---|---|
| 3,888,806 | 6/1975 | Kropscoti | 525/130 |
| 3,896,059 | 7/1975 | Wakefield et al. | 260/2.3 |
| 3,980,595 | 9/1976 | Schonfeld et al. | 260/3 |
| 4,107,100 | 8/1978 | Peterhans et al. | 428/423.9 |
| 4,112,176 | 9/1978 | Bailey | 428/304 |
| 4,113,186 | 9/1978 | Smith | 241/24 |
| 4,363,450 | 12/1982 | Schmidt | 241/24 |
| 4,426,488 | 1/1984 | Wyman | 524/836 |
| 4,452,920 | 6/1984 | Joubert | 521/109.1 |
| 4,505,984 | 3/1985 | Stelzer et al. | 428/424.7 |
| 4,511,626 | 4/1985 | Schumacher | 428/425.6 |
| 4,559,366 | 12/1985 | Hostettler | 36/25 R |
| 4,850,596 | 7/1989 | Olund | 273/408 |
| 4,863,106 | 9/1989 | Perkel | 241/5 |
| 4,920,663 | 5/1990 | Flemming | 36/25 R |

Primary Examiner—Paul J. Thibodeau
Assistant Examiner—D. S. Nakarani
Attorney, Agent, or Firm—Poms, Smith, Lande & Rose

[57] ABSTRACT

A non-cellular polyurethane composite material comprising desiccated rubber particles embedded in a non-cellular matrix of polyurethane. Rubber particles derived from tires and other sources are combined with a desiccant to remove moisture present in the particles. The resulting desiccated rubber particles and desiccant are mixed with a polyol and isocyanate to form a precursor blend which is cured to produce a non-cellular polyurethane composite. The resulting rubber-polyurethane composite may be used for tires, shoe and boot soles, surface coatings, and other applications requiring a material which is structurally strong and wear resistant. The desiccated rubber particles may be premixed with the polyol and/or added simultaneously with the polyol and isocyanate during composite molding.

12 Claims, No Drawings

NON-CELLULAR POLYURETHANE COMPOSITE

BACKGROUND OF THE INVENTION

1. Field of the Invention

The present invention relates generally to the recycling of rubber products. More particularly, the present invention relates to methods and compositions wherein comminuted scrap rubber is incorporated into a polyurethane matrix to form a wide variety of useful materials and products.

2. Description of Related Art

The recycling of rubber products has received a great deal of attention in recent years. Typical rubber recycling processes involve grinding or otherwise comminuting scrap rubber product to form rubber particles. These rubber particles are recycled by mixing them with various different binders and molding or otherwise fabricating the rubber-binder mixture into desired articles. Typical uses for recycled rubber particles include the formation of various underlayments, surface coatings, tires, and other articles where a strong and resilient material is required. The binders which have been used to form the composites of recycled rubber particles include asphalt, synthetic and natural rubber, epoxies, and polyurethanes.

The majority of rubber recycling effort has been directed toward automobile and truck tires. The extremely large amount of automobile and truck tires which are discarded each year require that some degree of recycling occur. Processes used to recycle automobile and truck tires must necessarily be well suited for handling large quantities of recycled material. The process must be capable of taking large quantities of rubber particles directly from tire grinding and shredding equipment and transforming the particles into a useful material which can be molded or shaped into desired finished products.

Polyurethane is a popular binder which has been used to form composites with recycled rubber particles. A common procedure for forming polyurethane involves mixing a polyisocyanate with a polyol and suitable catalyst. The resulting polyurethane will be a non-cellular material provided that a blowing agent is not added to the composition. Water functions as a blowing agent during polyurethane formation because the carbon dioxide generated by the reaction of water and isocyanate becomes trapped within the polyurethane matrix and produces a foam structure.

There are many uses for polyurethane composite materials where the recycled rubber particles are incorporated into a polyurethane foam structure. However, there are also many situations where it would be desirable to have the recycled rubber particles present in a non-cellular or non-foam polyurethane matrix. Such non-cellular polyurethane composite materials are well suited for use in tires, shoe and boot soles, mattings, and other applications where a high degree strength and wear resistance is required.

There presently is a need to provide a process in which rubber tires and other discarded rubber products can be incorporated into a polyurethane matrix in a simple and efficient manner to provide a non-cellular polyurethane composite material which has adequate functional properties including high strength and wear resistance.

SUMMARY OF THE INVENTION

In accordance with the present invention, a process is provided for taking recycled rubber particles and incorporating them into a polyurethane matrix to form a non-cellular polyurethane composite material. The present invention is based in part upon the discovery that the recycled rubber particles must be desiccated prior to mixing with the polyurethane precursors to prevent uncontrolled foaming and the resultant formation of a cellular matrix. It was discovered that the amount of moisture typically present in recycled rubber particles is sufficient to cause uncontrolled foaming during formation of polyurethane composite materials. This foaming produces a non-uniform product which includes undesirable areas of foam.

The materials produced in accordance with the present invention are non-cellular polyurethane composites which contain from 1 to 40 weight percent of desiccated rubber particles which are embedded in a non-cellular matrix of polyurethane. The non-cellular composite material is structurally strong and is wear resistant. The composite material is well suited for use in making tires, shoe and boot soles, paddings, and other applications where a non-cellular matrix is required.

As a feature of the present invention, the recycled rubber particles which contain moisture are mixed with a desiccant which desorbs substantially all of the moisture from the recycled rubber particles. Although the desiccant may be separated from the rubber particles after desorption of moisture, it was discovered that the combined mixture of desiccant and rubber can be directly mixed with the polyurethane-polyol raw material. The moisture remains locked within the desiccant and does not react with the isocyanate during elastomer formation to cause foaming.

As another feature of the present invention, desiccated rubber particles ranging in size from one micron to about two inches are incorporated in a polyurethane matrix to provide a wide variety of composites which can be molded into numerous different articles. The larger particles may be used in molding larger items, such as truck tires, while the smaller particles can be used to fabricate smaller items, such as shoe and boot soles.

As a further feature of the present invention, the rubber particles to be recycled may include up to about 5 weight percent of tire reinforcing material, such as metal, nylon or other belt materials typically used to reinforce automobile and truck tires. This feature allows recycling of tires without the need to separate metal and other belt materials from the rubber particles. Additionally, the desiccated rubber particles may be premixed with the polyol component or they can be mixed simultaneously in the mold with the other polyurethane components or both. Any of the three procedures provide uniform dispersion of the rubber particles throughout the polyurethane matrix.

The above-described and many other features and attendant advantages of the present invention will become better understood by reference to the following detailed description.

DETAILED DESCRIPTION OF THE INVENTION

The present invention has wide application to the recycling of rubber based products. The following detailed description will be limited to using rubber particles derived from automobile and truck tires as the source of recycled rubber. However, it will be understood by those skilled in the art that rubber particles derived from virtually any rubber-based product may be used.

The non-cellular polyurethane composite material in accordance with the present invention includes from 1 to 40 weight percent of desiccated rubber particles which are embedded in a non-cellular matrix of polyurethane. The desiccated rubber particles have a particle size which is preferably in the range of 1 micron to about 2 inches. The particles may be substantially uniform in particle size or the particles may cover a range of sizes. Rubber particle sizes in the range of 100 microns to 1 inch are particularly preferred. Rubber particles within this size range are especially well suited for making solid rubber tires and other items where a combination of good strength and wear resistance is required.

The rubber particles may be formed by any of the known grinding or comminuting processes presently used to recycle automobile and truck tires. The tire grinding equipment will not be described in detail since the actual procedures for grinding or comminuting automobile tires or other scrap rubber does not form part of the invention other than such equipment is necessary in order to produce large quantities of rubber particles for incorporation into the non-cellular polyurethane matrix of the present invention. The use of tire grinding equipment to comminute tires and other scrap rubber is widely known.

In accordance with the present invention, it is not necessary to separate the metal, rayon, polyester, aramide, polyamide-imide, nylon or other tire belting material from the rubber tire particles. This is advantageous when recycling large numbers of tires. Such tire belting particles may be incorporated directly into the polyurethane matrix along with the rubber particles provided that the amount of belting material does not exceed about 5 weight percent. The amount of metal or nylon belting material present in automobile tires is generally on the order of a few percent. Accordingly, the entire tire may be ground to the desired size range and recycled without separating out the metal or other belt material. Preferably, the final chopped metal or nylon cord will have lengths that are less than ¼ inch. The metal bead present in most automobile and truck tires is not suitable for inclusion with the rubber particle mixture and should be removed prior to comminution and recycling. Removal of the tire bead is carried out according to well-known procedures. When referring to the rubber particles to be incorporated into the polyurethane matrix, it will be understood that this mixture of particles may include up to about 5 weight percent metal, nylon, polyimide or other tire belting or chord material.

The rubber particles produced from automobile and truck tires generally will include up to 5 percent by weight absorbed moisture. This moisture can be removed by heating at elevated temperatures for periods of time on the order of a few hours to a few days. However, in accordance with the present invention, it is preferred that the moisture be removed or desorbed from the rubber particles by mixing the rubber particles with a suitable desiccant. Suitable desiccants include molecular sieves such as alkali metal alumina silicates, calcium chloride, glycerol, silicate gel, Bauxite, and the like. Molecular sieves are a preferred desiccant.

The desiccant is preferably in the form of small granules or powder having particle sizes with diameters of less than about 10 microns. The desiccant particles should be sufficiently small so that they can be intimately mixed with the rubber particles to insure efficient desorption of moisture from the rubber particles. The amount of desiccant which is added to the rubber particles should be equal to or in excess of the amount necessary to remove substantially all of the moisture from the rubber particles. Preferably the amount of desiccant added to the rubber particles will provide a rubber particle-desiccant mixture containing from about 5 weight percent to 15 weight percent desiccant. The preferred amount of desiccant in the rubber particle-desiccant mixture is about 10 weight percent. The amount of desiccant present in the final polyurethane composite is preferably between about 0.05 to 6 weight percent.

The desiccant and rubber particles are mixed together in a suitable container to insure intimate and uniform contact between the desiccant and rubber particles. The mixture is then left in a moisture free atmosphere for a sufficient time for the desiccant to desorb substantially all of the moisture from the particles. The resulting dehydrated or desiccated rubber particles should have less than 500 ppm (parts per million) water available for possible reaction with the polyurethane isocyanate component and preferably less than 200 ppm water. The mixture of desiccant and rubber particles need not be maintained at an elevated temperature as dehydration will typically take between 30 minutes to a few hours at room temperature to occur. The resulting desiccated rubber particles can then be used in accordance with the present invention to produce a non-cellular polyurethane composite material.

It has been found, surprisingly, that premixing of the desiccant into the polyurethane raw materials (e.g. the polyol) followed by addition of the non-desiccated rubber particles to the same mixture does not provide adequate desiccation of the adsorbed water from the rubber particles. Accordingly, it is preferred that the rubber particles be desiccated prior to mixing with the polyol.

In accordance with the present invention, the desiccated rubber particles are mixed with the polyurethane "B" Component (mixture of polyol, chain extender and catalyst) in the same manner as other filler materials. For example, the desiccated rubber particles are mixed with the polyol component and then this blend is combined with the polyisocyanate and cured according to conventional procedures utilizing a catalyst. The amount of desiccated rubber particles added to the polyurethane raw materials should be sufficient to provide a final composite material containing from one to forty weight per cent of desiccated rubber particles. For items such as tires, the preferred weight percent of desiccated rubber particles is about ten to twenty weight percent.

The desiccated rubber particles in accordance with the present invention may also be incorporated as a separate filler material which is added as a second component when using the centrifugal molding apparatus and method disclosed in U.S. Pat. Nos. 4,943,223 and 4,855,096, the contents of which are hereby incorporated by reference. When using this centrifugal molding apparatus and method, the desiccated rubber particles are continuously dispensed in conjunction with the dispensing of the combined liquid polyurethane components. In this preferred manner, excellent dispersion and transportation of the desiccated polyurethane mixture to the mold cavity is achieved during the centrifugal casting process. Therefore it is possible, using desiccated premixed rubber in the polyol component and/or added as a separate stream to advantageously achieve an overall rubber content in the final product of forty weight percent and even higher.

The particular polyisocyanate and polyol utilized to make the non-cellular polyurethane matrix is not critical. Preferred polyurethanes for tire applications are of the elastic variety, such as elastomeric materials of 20 Shore A to about 60 Shore D hardness. Polyisocyanates which may be used in accordance with the present invention include methylene diphenyl diisocyanate (MDI), toluene diisocyanate (TDI), naphthalene diisocyanate (NDI), all aliphatic and cycloaliphatic types, aliphatic/aromatic types and variants of them such as uretonimines, prepolymers, trimers, biurets and the like. Suitable polyols include polyethers derived from propylene and ethylene oxides, 1, 2 butylene oxide and tetrahydrofuran, polybutadiene and co-monomers, polycarbonate polyols, polyester polyols derived from aliphatic and aromatic polyacids and glycols, polycaprolactone polyester polyols and the like. The catalyst can be any of the well known polyurethane catalysts typically in use. Exemplary catalysts include the organo-metallic types such as stannous octoate and dibutyl tin dilaurate including derivatives of mercury, bismuth, antimony, lead, titanium.

In addition to the rubber particles, a variety of other fillers may also be added to the composition. For example, conventional fillers and reinforcing agents such as aluminum trihydrate, carbon black, calcium carbonate, clay, glass, wollastonite, mica, etc. can be incorporated into the polyurethane. The amount of filler may be varied depending upon the desired properties of the final product. Preferably the amount of filler should be no more than about thirty-five weight percent.

The molds used to form the non-cellular polyurethane composite materials in accordance with the present invention can be any of the various molds typically used in forming polyurethane materials. Metal molds, such as steel and aluminum, may be used. In addition epoxy molds, polyester reinforced fiberglass molds, silicone rubber molds, and polyurethane molds can be utilized. Normal cycling times, temperatures and pressures generally used in forming non-cellular polyurethane products are suitable. The presence of substantial amounts of desiccated rubber particles in the polyurethane reacting mixture does not substantially alter the curing properties and molding parameters. Any of the known processes can be used including centrifugal and rotational molding transfer and compression molding.

Examples of practice are as follows:

EXAMPLES 1

A non-cellular matrix of polyurethane containing approximately 12 percent of desiccated rubber particles was molded to form a 480×8 forklift tire. The tire was prepared by molding, utilizing centrifugal polyurethane molding equipment in the following manner.

Three pounds of rubber particles obtained from grinding up a used automobile tire were mixed with 0.3 pounds (136 gms.) of MOLSIV ® (molecular sieves) obtained from U.O.P. Corporation (Des Plaines, Illinois). The rubber particles had an average particle size of from 100 microns to 1.5 inches and the molecular sieves had an average particle size of 1-4 microns. The rubber particles and molecular sieves were intimately mixed and stored in a sealed container for 2 hours to insure complete absorption of water from the rubber particles.

A polyurethane elastomer system of 93 Shore A was prepared from an MDI prepolymer and a oxypropyleneoxyethylene polyol, glycol chain extender and an organo tin catalyst. The polyisocyanate ("A" component) and the balance of the raw materials ("B" component) were charged to a two component, polyurethane metering and mixing machine in the standard ratio for mixing A and B components. Both components were conditioned at 100 degrees Fahrenheit. The polyurethane system was test poured in a cup at an overall dispense rate of 30 pounds per minute and had a set time of approximately 45 seconds.

A two piece polyurethane mold was preconditioned at 150 degrees Fahrenheit, placed in the centrifugal casting apparatus of the type disclosed in U.S. Pat. Nos. 4,943,223 and 4,855,096, and rotated at 150 revolutions per minute (RPM). Pouring of the polyurethane system on the center receiving plate was initiated for 5 seconds before co-dispensing of the desiccated rubber began. The desiccated rubber was dispensed at approximately 4.5 pounds per minute onto the receiving plate closely adjacent (approx. 1 inch) from the stream of polyurethane system. After 41 seconds the desiccated rubber had been completely added and the polyurethane system continued to fill for an additional 5 seconds before mold filling was completed. After 60 seconds of curing, spinning was halted, the mold was opened and the completed 480×8 tire was removed. The surface of the tire had a smooth, defect free appearance and had a hardness of approximately 70-75 Shore A at demold. The tire contained about 12 weight percent rubber. A section was cut through the tire and revealed complete homogeneity and even distribution of the rubber particles throughout the tire except at the most exterior (tread area) and interior (band areas) where no rubber had been added during pouring. A second pour, identical to the above example produced a molding suitable for use as a forklift tire. The physical properties of this forklift tire are set forth in Table 1. A control tire was made in accordance with the above-described procedure except no desiccated rubber particles were added.

TABLE 1

| Test | Control | Example 1 | Example 2 | Example 4 |
|---|---|---|---|---|
| Compression Modulus @ | | | | |
| 10% psi | 3214 | 2428 | 1800 | — |
| 20% psi | 3143 | 2971 | 2864 | 2500 |
| 30% psi | 3571 | 2700 | 3262 | 3095 |
| Tear Strength Die C (pli) (Wear Area) | 166 | 188 | 330 | 270 |
| Compression Set, % 22 hrs/70° C./ 25% Defl. Plied Samples/Meth.B | 7 | 6 | 11 | 4 |
| Abrasion Resistance H22/100 gms/ 1000 cycl. Wt. Loss, mgs. | 14 | 102 | 92 | 62 |
| Bashore Rebound, % | 26 | 20 | 22 | 22 |

EXAMPLE 2

A 480×8 forklift truck tire was made according to the procedure in Example 1 except the rate of addition of the desiccated rubber was increased to 8.6 pounds per minute. The total dispense time was decreased to thirty-seven seconds. The polyurethane components were dispensed for forty-seven seconds at thirty pounds per minute. The tire was demolded one minute after completion of pouring and contained eighteen percent rubber. The rubber particles were evenly dispersed except in the outermost tread area which was formed during the first five seconds of pouring when desiccated rubber was to being added. No foamed areas were noted. The resulting tire would be suitable for use as a forklift tire. The physical properties of this forklift tire are set forth in Table 1.

EXAMPLE 3

A 480×8 tire was made according to the process followed in Example 1 except that the rubber particles were not treated with the desiccating agent (molecular sieves). Visual inspection of the demolded tire revealed flaws on the surface consisting of foamy areas which also were seen in the interior of the tire when cut open. This tire would not be acceptable for use as a forklift tire.

EXAMPLE 4

A 480×8 tire was made according to the process followed in Example 2 except that the desiccated rubber particles were premixed at a level of thirty-five percent in Component "B" (polyol, chain extender and catalyst) prior to charging it to the polyurethane metering and mixing machine. No additional rubber as added as a second stream during centrifugal casting of the tire. The tire, containing an overall rubber content of 18 weight percent, was demolded after 60 seconds of curing and visually inspected. A smooth, defect free surface was noted and good dispersion and homogeneity was observed after a cross-section was cut from the tire. This tire would be suitable for use as a forklift tire. The physical properties of this tire are also set forth in Table 1. As can be seen from Table 1, the shear strength for the tires in accordance with the present invention were unexpectedly higher than the shear strength of the control tire.

EXAMPLE 5

A 480×8 tire was made according to the process in Example 3 except that the desiccant was added as a powder to the "B" component and thoroughly dispersed by agitation for 30 minutes at a temperature of 70 degrees Centigrade prior to adding the rubber particles to the "B" component. After demolding it was observed the surface of the tire had foamy defect areas as did the interior of the molding rendering the tire not suitable for use as a forklift tire.

EXAMPLES 6 THROUGH 16

In these examples, 480×8 forklift tires were prepared according to the process in Example 1 using approximately 11-12 weight percent rubber particles added directly to the centrifugal casting plate. The RPM of the molds and speed of the polyurethane reaction were varied and both desiccated and non-desiccated were used for each condition. The mold temperature for all cases was 150° F. The polyurethane was a polyether-MDI based material with a Shore A hardness of 93. A summary of the examples is set forth in Table 2.

As is apparent from Table 2, in those cases where no desiccant was used, regardless of the pouring conditions, lower density, softer core material resulted.

TABLE 2

| | GEL TIME SECS | DESICCANT WT % | DISPENS LBS/MIN | DISPENS SECS. | MOLD SPEED RPM | CORE DENS LBS/FT3 | CORE Å DURO | TREAD Å DURO | COMMENTS |
| --- | --- | --- | --- | --- | --- | --- | --- | --- | --- |
| EXAMPLE 1 | 45 | 10 | 30 | 51 | 150 | 72.60 | 88 | 90 | FIRM, SMOOTH SKIN AND CORE, NO VISIBLE DEFECTS |
| EXAMPLE 6 | 45 | 0 | 30 | 51 | 150 | 65.66 | 78 | 87 | GOOD TREAD SKIN, SIDEWALL FOAM PATCHES, CORE SOFT |
| EXAMPLE 7 | 45 | 10 | 30 | 51 | 100 | 69.22 | 85 | 88 | GOOD, SMOOTH OUTER SKIN FIRM CORE |
| EXAMPLE 8 | 45 | 0 | 30 | 51 | 100 | 59.12 | 75 | 86 | SOME SKIN PATCHINESS, FOAMY, SOFT CORE |
| EXAMPLE 9 | 15 | 10 | 30 | 51 | 150 | 70.50 | 87 | 90 | FIRM TREAD, SIDEWALL, CORE DEFECT FREE |
| EXAMPLE 10 | 15 | 0 | 30 | 51 | 150 | 62.50 | 76 | 87 | GOOD TREAD, PATCHY SIDEWALL, CORE SOFT |
| EXAMPLE 11 | 15 | 10 | 30 | 51 | 100 | 70.92 | 83 | 86 | GOOD OUTER SKINS CORE FIRM, NO FOAM |
| EXAMPLE 12 | 15 | 0 | 30 | 51 | 100 | 61.40 | 73 | 85 | SKIN SMOOTH, A FEW SOFT AREAS CORE, SOFT AREAS |
| EXAMPLE 13 | 120 | 10 | 23.8 | 65 | 150 | 69.87 | 87 | 89 | OUTER SKIN SMOOTH, NO DEFECTS CORE, |

TABLE 2-continued

| | GEL TIME SECS | DESICCANT WT % | DISPENS LBS/MIN | DISPENS SECS. | MOLD SPEED RPM | CORE DENS LBS/FT3 | CORE Å DURO | TREAD Å DURO | COMMENTS |
|---|---|---|---|---|---|---|---|---|---|
| EXAMPLE 14 | 120 | 0 | 23.8 | 65 | 150 | 66.40 | 76 | 90 | FIRM TREAD SKIN SMOOTH, SIDEWALL SOME PATCHINESS, CORE SOFT |
| EXAMPLE 15 | 120 | 10 | 23.8 | 65 | 100 | 68.42 | 85 | 89 | OVERALL SKIN DEFECT FREE CORE FIRM, NO FOAMY AREAS |
| EXAMPLE 16 | 120 | 0 | 23.8 | 65 | 100 | 58.68 | 75 | 87 | SKIN, SOME PATCHINESS, CORE SOFT, FOAMY AREAS |

EXAMPLE 17

A 480×8 fork lift tire was molded according to the process described in Example 1 except 3 pounds of aluminum trihydrate was mixed in with the desiccated rubber prior to mold filling. A corresponding reduction in the fill time of the polyurethane was made to yield an overall tire weight similar to Example 1. The resultant hard, non-cellular tire would have utility in industrial applications requiring additional load bearing properties.

EXAMPLE 18

A 480×8 fork lift tire was molded according to the process of Example 1 except 20 percent of Aluminum Trihydrate was mixed into the polyol component ("B" Side). A hard, non-cellular tire was produced which would be suitable for high load bearing industrial applications.

EXAMPLE 19

A 480×8 fork lift tire was molded according to the process of Example 4 except an additional 5.3 pounds of desiccated rubber was added as a separate stream. Corresponding reduction in the polyurethane components was made to yield an overall tire weight similar to Example 1. A uniform, homogeneous tire was demolded after 60 seconds which contained an overall rubber content of 38 percent. This tire would be suitable for use to industrial applications.

EXAMPLE 20

The process outlined in Example 3 was attempted adding non-desiccated rubber to the polyisocyanate component ("A" side). After several minutes visual foaminess of the polyisocyanate component was noted and tires could not be produced from it. This example was repeated with desiccated rubber and while initial mixture stability was noted, after several hours foaminess was very evident and tires could not be produced from it.

EXAMPLE 21

The conditions and process parameters used for Example 4 were also used to prepare a 16×5×10.5 Press-on Industrial fork-lift tire (POI). This tire was tested according to a standard four-step loading endurance test. The fork-lift tire successfully passed the four-step loading endurance test as follows:

| 16 × 5 × 10.5 FORKLIFT/11–12% DESICCATED RUBBER | |
|---|---|
| RAV TEST NUMBER | 2383 |
| TIRE WEIGHT, LBS. | 32.37 |
| DUROMETER, SHORE A | 94 |
| O.D., INCHES | 15.97 |
| STATIC SPRING RATE | 147.61 |
| BOUNCE, NUMBER | 8.3 |
| HEIGHT, INCHES | 14.03 |
| ENDURANCE, HRS @ 2856 LBS. | 2.0 |
| ENDURANCE, HRS @ 3808 LBS. | 2.0 |
| ENDURANCE, HRS @ 4760 LBS. | 2.0 |
| ENDURANCE, HRS. @ 5713 LBS. | 2.0 |
| TOTAL MILES | 96.0 |
| OBSERVATIONS | NO DEFECTS TEMPERATURE DID NOT EXCEED 200° F. |

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A non-cellular polyurethane composite material comprising from 1 to 40 wt % of desiccant dried rubber particles having a moisture content of less than 500 ppm incorporated in a polyurethane matrix, wherein said desiccant dried rubber particles have been dried prior to adding to said polyurethane by mixing rubber particles with desiccant.

2. A non-cellular polyurethane composite material according to claim 1 wherein the desiccant dried rubber particles have a particle size in the range of about one micron to about two inches.

3. A non-cellular polyurethane composite material according to claim 1 wherein the desiccant dried rubber particles are made by mixing recycled rubber particles which contain absorbed moisture with a sufficient amount of a desiccant for a sufficient time to desorb substantially all of the moisture from said recycled rubber particles to form said desiccant dried rubber particles.

4. A non-cellular polyurethane composite material according to claim 3 wherein said recycled rubber particles are mixed with from 5 to 15 weight percent of said desiccant.

5. A non-cellular polyurethane composite material according to claim 1 wherein said composite material comprises from 0.05 to 6 weight percent of said desiccant.

6. A non-cellular polyurethane composite material according to claim 1 wherein said desiccant is an alkali metal alumino-silicate.

7. A non-cellular, polyurethane composite material according to claim 1 wherein said composite material is in the shape of a tire.

8. A non-cellular polyurethane composite material according to claim 1 wherein said polyurethane is selected from the group of polyurethanes having a hardness of between Shore A 20 and Shore D 60.

9. A non-cellular polyurethane composite material according to claim 8 wherein said polyurethane has a Shore hardness of about 93.

10. A non-cellular polyurethane composite material according to claim 9 wherein said rubber particles have a particle size in the range of about 1 micron to about 2 inches.

11. A non-cellular polyurethane composite material according to claim 1 wherein said recycled rubber particles are made from rubber tires wherein the desiccant dried rubber particles include less than 5 wt % chopped metal or other tire belting material.

12. A non-cellular polyurethane composite material according to claim 1 wherein said composite material is in the shape of a shoe or boot sole.

* * * * *